United States Patent
Hwang et al.

(10) Patent No.: US 10,424,765 B2
(45) Date of Patent: Sep. 24, 2019

(54) COVER HAVING METALLIC GRID STRUCTURE AND METHOD FOR MANUFACTURING THE COVER

(71) Applicant: Samsung Electronics Co., Ltd., Gyeonggi-do (KR)

(72) Inventors: Yong-Wook Hwang, Gyeonggi-do (KR); Sung-Ho Cho, Gyeonggi-do (KR); Hee-Cheul Moon, Gyeonggi-do (KR); Seung-Chang Baek, Seoul (KR); Chan-Seob Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 176 days.

(21) Appl. No.: 13/907,615

(22) Filed: May 31, 2013

(65) Prior Publication Data

US 2013/0323579 A1 Dec. 5, 2013

(30) Foreign Application Priority Data

May 31, 2012 (KR) ........................ 10-2012-0058821

(51) Int. Cl.
*H01M 2/04* (2006.01)
*H04M 1/02* (2006.01)
(Continued)

(52) U.S. Cl.
CPC ..... *H01M 2/0404* (2013.01); *B29C 45/14065* (2013.01); *H01Q 1/243* (2013.01);
(Continued)

(58) Field of Classification Search
CPC ............. H01M 2/0404; H04M 1/0202; H04M 1/0283; B29L 2031/3437; B29L 2031/3456; B29C 2045/1477
See application file for complete search history.

(56) References Cited

U.S. PATENT DOCUMENTS

2006/0158897 A1 7/2006 Choi et al.
2008/0019083 A1* 1/2008 Lim et al. .................... 361/679
(Continued)

FOREIGN PATENT DOCUMENTS

CN 1808241 A 7/2006
CN 101110850 A 1/2008
(Continued)

OTHER PUBLICATIONS

Extended European Search dated Sep. 24, 2013 in connection with European Patent Appliction No. 13169087.7; 7 pages.
(Continued)

*Primary Examiner* — Jonathan G Jelsma (57) ABSTRACT

Provided are a cover having a metallic grid structure and a method for manufacturing the cover. The cover includes a pattern portion formed of a metallic material, in which a plurality of patterns are independently disposed spaced apart from each other and an injection portion disposed between pattern portions to connect the pattern portions, the injection portion being formed of a non-metallic material. The method includes forming a pre-pattern portion including patterns in a regular or irregular form and a bridge connecting the patterns on a metallic plate, forming the injection portion on the pre-pattern portion by insert-injection or thermo-compression press, and removing the bridge.

21 Claims, 9 Drawing Sheets

(51) Int. Cl.
  *B29C 45/14* (2006.01)
  *B29L 31/34* (2006.01)
  *H01Q 1/24* (2006.01)
  *H01Q 1/42* (2006.01)
  *H01Q 15/00* (2006.01)

(52) U.S. Cl.
  CPC .......... *H01Q 1/42* (2013.01); *H01Q 15/0013* (2013.01); *H04M 1/0202* (2013.01); *H04M 1/0283* (2013.01); *B29C 2045/1477* (2013.01); *B29L 2031/3437* (2013.01); *B29L 2031/3456* (2013.01); *H04M 1/0262* (2013.01)

(56) References Cited

U.S. PATENT DOCUMENTS

| | | | | |
|---|---|---|---|---|
| 2010/0201582 | A1* | 8/2010 | Nam | B29C 45/14639 343/702 |
| 2011/0068984 | A1* | 3/2011 | Han | B29C 45/14065 343/702 |
| 2011/0279002 | A1* | 11/2011 | Han | H01Q 5/40 312/223.1 |
| 2011/0317343 | A1* | 12/2011 | Shin | B29C 45/14811 361/679.01 |
| 2012/0329531 | A1* | 12/2012 | Park et al. | 455/572 |
| 2013/0229362 | A1* | 9/2013 | Liu et al. | 345/173 |

FOREIGN PATENT DOCUMENTS

| | | |
|---|---|---|
| CN | 102244991 A | 11/2011 |
| CN | 102316687 A | 1/2012 |
| DE | 202010014774 U1 | 1/2012 |
| EP | 1 880 821 A1 | 1/2008 |
| KR | 10-2010-0014027 A | 2/2010 |
| KR | 1020100013569 A | 2/2010 |
| KR | 10-2010-0058116 A | 6/2010 |
| KR | 20-2010-0007150 U | 7/2010 |
| KR | 1020110133119 A | 12/2011 |

OTHER PUBLICATIONS

State Intellectual Property Office of the P.R.C., "First Office Action," Application No. 2013102101962, dated Nov. 17, 2016, 18 pages, publisher SIPO, Beijing Shi, China.

Communication from a foreign patent office in a counterpart foreign application, KIPO, "Notification of the Reasons for Rejection," Application No. KR 10-2012-0058821, dated Jul. 10, 2018, 7 pages.

Decision of Grant dated Jan. 29, 2019 in connection with Korean Patent Application No. 10-2012-0058821, 8 pages.

* cited by examiner

COVER HAVING METALLIC GRID STRUCTURE AND METHOD FOR MANUFACTURING THE COVER

CROSS-REFERENCE TO RELATED APPLICATION(S) AND CLAIM OF PRIORITY

The present application is related to and claims the benefit under 35 U.S.C. § 119(a) of a Korean Patent Application No. 10-2012-0058821, filed in the Korean Intellectual Property Office on May 31, 2012, the entire disclosure of which is hereby incorporated by reference.

TECHNICAL FIELD OF THE INVENTION

The present disclosure generally relates to a portable terminal, and more particularly, to a portable terminal which reduces signal loss for implementing a Long Term Evolution (LTE) service to improve antenna reception performance.

BACKGROUND OF THE INVENTION

Generally, portable terminals refer to apparatuses allowing a user to enjoy various contents while carrying them, such as a portable communication apparatus, an MP3 player, a Portable Multimedia Player (PMP), an electronic book, and so forth.

A case of the portable terminal can be visually checked by the user, and it is natural that the user choose a portable terminal having an elegant design and a high-quality exterior among portable terminals having similar functions. In particular, with the recent spread of a bar-type portable terminal, a large display is disposed on a front surface of the portable terminal and a battery cover for covering a battery is disposed on a rear surface thereof. The battery cover of the portable terminal is manufactured with plastic, a magnesium alloy, an aluminum alloy, etc. By nature of the portable terminal, the battery cover has to have light weight and good abrasion resistance, shock resistance, and yield strength. Moreover, in the rear surface of the portable terminal, that is, the battery cover, a material which does not affect antenna radiation performance, such as plastic, is used in the periphery of the antenna to secure antenna radiation performance. For example, when the battery cover is implemented with a metallic material, antenna radiation performance is not sufficiently secured. Therefore, conventionally, in a battery cover portion at a position in which the antenna is installed, an injection material, such as Polycarbonate (PC), urethane, etc., is applied to a portion of metals. As a result, the battery cover can be divided into the first region using metallic material and the second region using injection material, such as PC, urethane, or the like, for the second region requiring antenna radiation in correspondence to positions in which antennas are installed. A conventional battery cover is disclosed in a Korean Patent Application Publication No. 10-2010-0058116 (published on Jun. 3, 2010 and entitled "Battery Pack for Portable Terminal").

Figure 1:
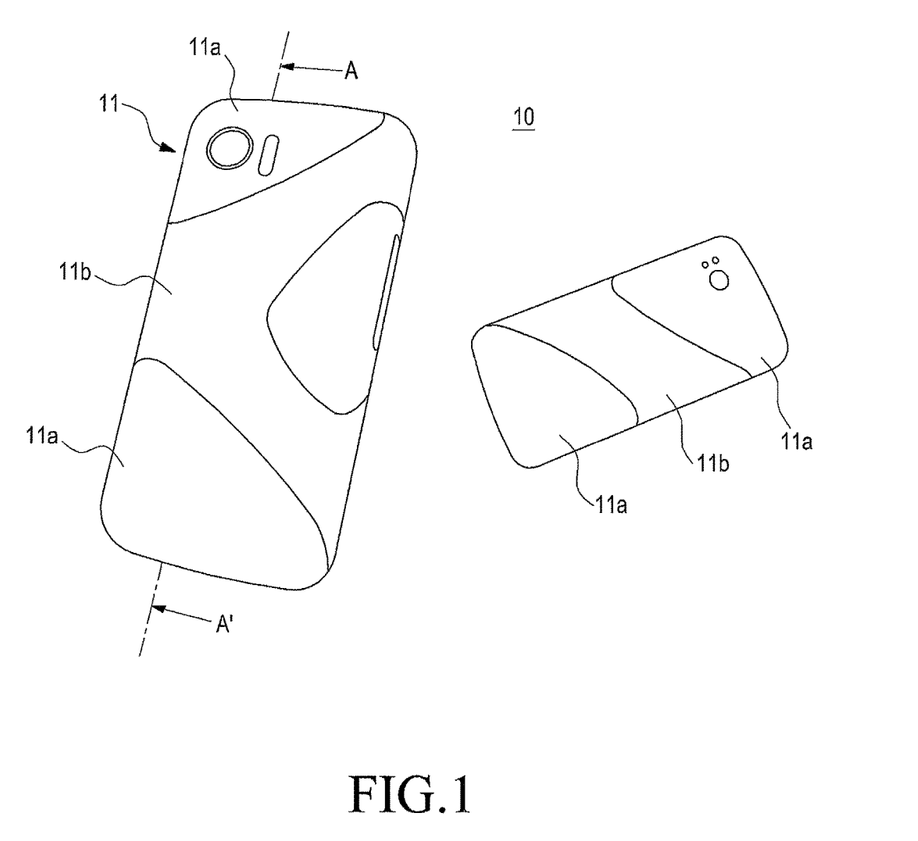
FIG. 1 is a view schematically showing a structure of a conventional battery cover.
Figure 2:
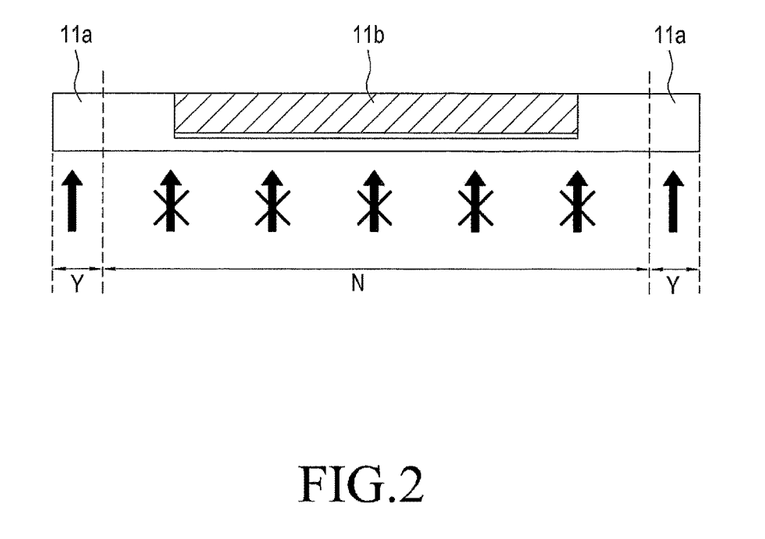
FIG. 2 is a view schematically showing a cross-section cut along a line A-A' of FIG. 1 and antenna radiation performance thereof.

FIG. 1 is a view schematically showing a structure of a conventional battery cover, and FIG. 2 is a view schematically showing a cross-section cut along a line A-A' of FIG. 1 and antenna radiation performance thereof. With Reference to FIGS. 1 and 2, to avoid an influence upon antenna radiation performance, a metallic material cannot be used in a portion of a battery cover 11, specifically, a portion of the battery cover 11 in a position where an antenna is built in to implement antenna radiation capability, thus, an injection material region 11a such as PC, urethane, etc., is disposed in that portion of the battery cover 11. That is, when the antenna is installed in upper and lower positions of the portable terminal, a metallic material region 11a in which antenna radiation is limited (a region 'N' in FIG. 2) is formed in a center portion of the battery cover 11, and the injection material region 11a in which antenna radiation is possible (a region 'Y' in FIG. 2) is provided in an antenna mounting position above and below the metallic material region 11a. However, that the battery cover 11 is divided into the injection material region 11a and the metallic material region 11a, causes design constraints and degrading sophistication to a portable terminal with a metallic material.

SUMMARY OF THE INVENTION

To address the above-discussed deficiencies of the prior art, it is a primary object to provide a cover having a metallic grid structure and a method for manufacturing the cover, in which a metallic material is used across a cover, especially, a battery cover provided in an electronic device or the like, and antenna performance can be secured across the cover, thereby diversifying a cover material and guaranteeing a sophisticated design of a portable terminal.

According to an aspect of the present disclosure, there is provided a cover having a metallic grid structure, the cover including a pattern portion formed of a metallic material, in which a plurality of patterns are independently disposed spaced apart from each other and an injection portion disposed between pattern portions to fix the pattern portions, the injection portion being formed of a non-metallic material.

According to another aspect of the present disclosure, there is provided a cover having a metallic grid structure, the cover including a pattern portion formed of a metallic material, in which a plurality of patterns are independently disposed spaced apart from each other, a connection film layer which is surface-treated, on a side surface of which the patterns are disposed, and an injection portion provided on a bottom surface of the connection film layer and formed of a non-metallic material, the injection portion being filled between the patterns.

According to still another aspect of the present disclosure, there is provided a method for manufacturing a cover having a metallic grid structure, the method including forming a pre-pattern layer having patterns in a regular or irregular form and at least one bridge connecting the patterns on a metallic plate, forming the injection portion on the pre-pattern layer by insert-injection or thermo-compression press, and removing the bridge.

According to yet another aspect of the present disclosure, there is provided a method for manufacturing a cover having a metallic grid structure, the method including forming a pattern portion having independently spaced patterns on a master and forming a connection film layer on which the pattern portion is mounted, separately from the pattern portion, applying an adhesive onto a surface of the pattern portion, adhering the connection film layer to a surface of the pattern portion to which the adhesive is applied, and removing the master, and performing insert-injection or thermo-compression press with respect to the injection portion under the connection film layer at a high temperature and a high pressure.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 5A through 6E schematically show a process of manufacturing a cover having a metallic grid according to the first embodiment of the present disclosure, in which the shapes of bridges vary;

FIGS. 7A through 7D are flowcharts showing other embodiments of a method for manufacturing a cover having a metallic grid structure shown in FIGS. 3A through 6E;

FIGS. 8A through 8E are views showing a cover having a metallic grid structure according to a second embodiment of the present disclosure;

DETAILED DESCRIPTION OF THE INVENTION

FIGS. 3A through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electric device. Hereinafter, a cover having a metallic grid structure and a method for manufacturing the cover according to the present disclosure will be described with reference to the accompanying drawings. In this process, the thicknesses of lines and sizes of components shown in the drawings can be exaggerated for the clarity and convenience of explanation. Terms hereunder are defined on the basis of the function in the present disclosure, and can vary in accordance with users' or operators' intention, usual practices, and so on. Therefore, the definition of the terms should be made based on the whole contents of the specification. Although ordinal numbers such as "first", "second", etc., have been used in an embodiment of the present disclosure, they are merely intended to distinguish objects having the same name and their order can be set arbitrarily and the preceding description of an object can be applied to a next-order object.

The present disclosure proposes a cover having a metallic grid structure and a method for manufacturing the cover, in which by using a metallic material across a cover, e.g., a rear case or a battery cover for covering a battery, of an electronic device such as portable terminal, specifically, a portable terminal having a built-in antenna, the quality of the portable terminal can be implemented without affecting antenna radiation performance. Prior to description of first and second embodiments of the present disclosure, the cover having the metallic grid structure will be described based on a battery cover provided to an electronic device or the like. However, the cover is not limited to the battery cover, and any cover can be used for, e.g., a rear case or a front case of the electronic device, as long as it does not affect antenna radiation performance and has the metallic grid structure.

FIGS. 3A through 7D show a cover having a metallic grid structure and a method for manufacturing the cover according to a first embodiment of the present disclosure. With reference to FIGS. 3A through 7D, the first embodiment will be described as follow.

Figure 3A:
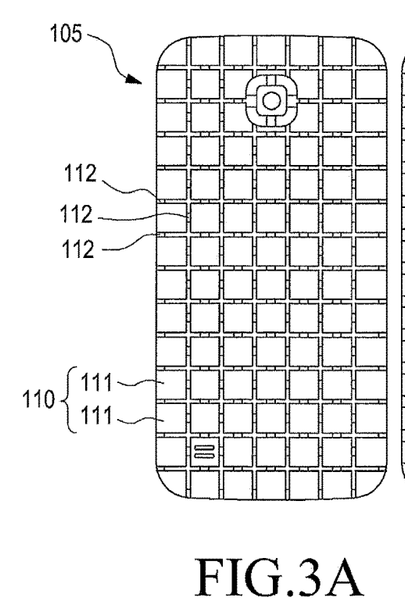
FIGS. 3A and 3B are views schematically showing a pre-pattern portion including patterns and a bridge in a battery cover of a cover having a metallic grid structure according to a first embodiment of the present disclosure.
Figure 3B:
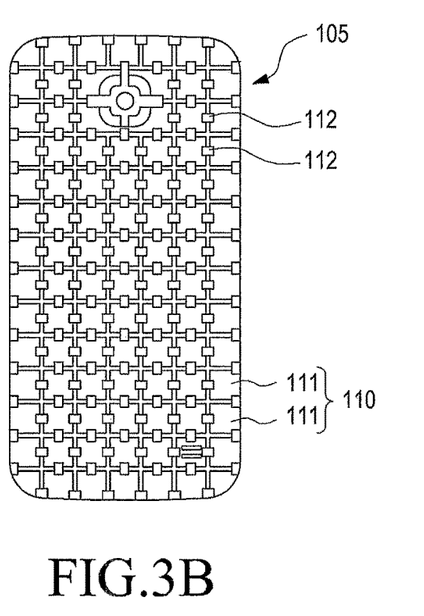
Figure 4A:
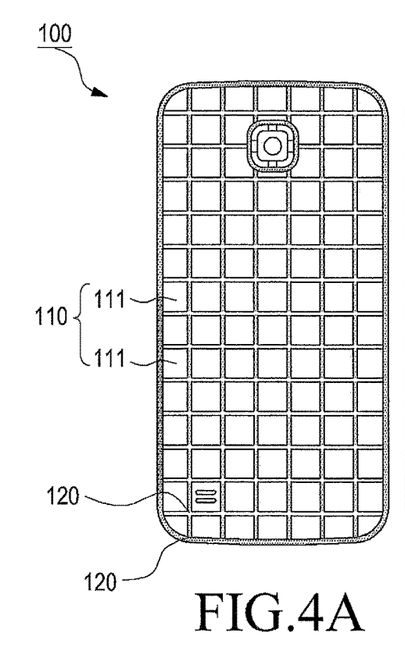
FIGS. 4A and 4B are views showing a state where an injection portion is formed between patterns after removal of the bridge from the pre-pattern portion of FIGS. 3A and 3B.
Figure 4B:
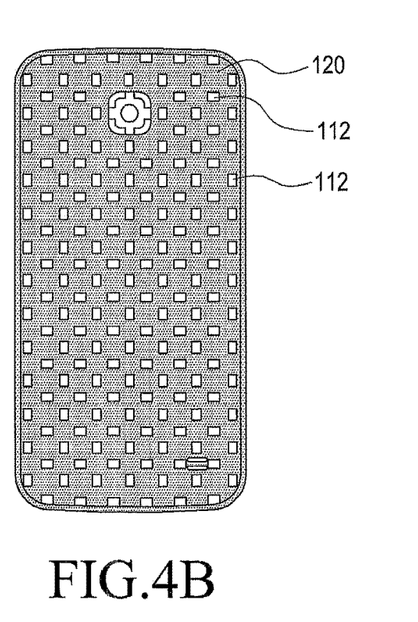

FIGS. 3A and 3B are plain views schematically showing a pre-pattern portion including patterns and bridges in a cover having a metallic grid structure according to an embodiment of the present disclosure, and FIGS. 4A and 4B are plain views showing a state where injection portions are formed between the patterns after removal of the bridges from the pre-pattern portion of FIGS. 3A and 3B.

With reference to FIGS. 3A through 4B, a cover having a metallic grid structure (hereinafter, 'a battery cover 100', see FIGS. 4A and 4B) includes a pattern portion 110 formed of a metallic material such as aluminum, STS, or the like, and an injection portion 120 formed of a material of a different kind from the metallic material. The pattern portion 110 includes a plurality of patterns 11 independently spaced apart from each other to secure antenna radiation performance at any position on the battery cover 100. The battery cover 100 mounted on the portable terminal also includes the injection portion 120 between patterns 111, each of which being independently spaced apart from each other, but when the injection portion 120 is provided between the patterns 111 to prevent the plurality of patterns 111 from being dislocated from each other, the plurality of patterns 111 are connected to each other through the injection portion and thus be fixed in their positions. Therefore, the patterns 111 are formed by a pre-pattern layer 105 before the injection portion 120 is provided. More specifically, with a metallic plate (101 of FIGS. 5A through 5E) corresponding to the entire size of the battery cover 100, the pre-pattern layer 105 having a bridge 112 connecting the plurality of patterns 111 is formed through press, forging, etching, or CNC (Computerized Numerical Control) processing. As mentioned before, the pre-pattern layer 105 is a pre-version of the pattern portion 110 and includes the plurality of patterns 111 and the bridge 112 connecting the plurality of patterns 111 to fix the positions of the plurality of patterns 111 to each other.

FIGS. 5A through 6E are views schematically showing a process of manufacturing a cover having a metallic grid according to an embodiment of the present disclosure, in which the shapes of bridges are different from each other. With reference to FIGS. 5A through 6E, the patterns 111 are formed to be spaced apart from each other on a surface of the metallic plate 101, and have regular or irregular forms. The bridge 112 is formed between the patterns 111 on the other surface of the metallic plate 101 through etching, forging, press or CNC processing. The bridge 112 fixes the patterns 111 to each other, thus aligning the positions of the patterns 111. That is, when the injection portion 120 is formed by insert-injection or thermo-compression pressing between the patterns 111, the bridge 112 fixes the patterns 111 such that the positions of the patterns 111 are not changed. The bridge 112 allows the patterns 111 to be independently positioned on the injection portion 120 without being connected to each other when bridges 112 are removed through CNC after being formed between the patterns 111 and under the patterns 111. As the patterns 111 are spaced apart from each other in the injection portion 120, antenna radiation can pass through the space between the patterns, so the radiation performance across the battery cover 100 can be secured. Therefore, regardless of where an antenna (not shown) is installed in the portable terminal, the battery cover 100 using a metallic material can be positioned without affecting antenna radiation performance. While the bridges 112 are connected to each other laterally under the patterns 111 in the this embodiment (see FIGS. 5A through 5E), the bridges 112 can also protrude laterally downwardly from the patterns 111 (see FIGS. 6A through 6E), such that the bridges 112 are positioned under the patterns 111 in such a way to be easily removed later as well as to form a space for forming the injection portion 120. Therefore, the shape, form, configuration, structure, and so forth of the bridge 112 can vary as long as the bridges 112 fix the positions of the patterns 111 and are removable later.

The injection portion 120 is formed by a method such as insert-injection or thermo-compression press by the pre-pattern layer 105 including the patterns 111 and the bridges 112. That is, the injection portion 120 is formed by filling a material of a different kind from a metallic material, specifically, a material such as polycarbonate (PC), acrylonitrile-butadien styrene (ABS), polyamide (PA), polyphthalamide (PPA), or polyphenylene sulfide (PPS) between the patterns 111 by using a method such as insert-injection or thermo-compression press. After the injection portion 120 is formed on the pre-pattern layer 105, the bridges 112 are removed, thereby implementing the battery cover 100 capable of securing antenna capability over the entire area. The pre-pattern layer 105 formed horizontally along the shape of the portable terminal can have a curve along the shape of the battery cover 100. In case of foaming, the pre-pattern layer 105 is formed and then foamed to form an exterior shape, without being limited thereto. That is, various modifications are possible such that the metallic plate 101 can be in advance formed to have an exterior shape of the battery cover 100 before formation of the pre-pattern layer 105, and then the pre-pattern layer 105 can be formed. The patterns 111 are portions which can be visually checked from the outer side of the battery cover 100, such that exterior quality can be improved by implementing colors or surface shapes on the pattern portion 110. For example, a surface of the pattern portion 110 can be hairline-processed and at least one surface-treatment such as sandblasting, anodizing deposition, or painting is performed, thereby variously expressing the surface of the battery cover 100. In this embodiment, surface-treatment is performed on a surface of the pattern portion 110, without being limited thereto. For example, by processing the surface-treated metallic plate 101, the pattern portions 110 spaced apart from each other can be formed, and after the pre-pattern layer 105 is formed, surface-treatment can be first performed prior to formation of the injection portion 120. In this way, various modifications can be carried out. By applying surface-treatment to the pattern portion 110, aesthetic sensibility of the battery cover 100 can be further improved and sophistication of the exterior can be achieved.

Figure 7A:
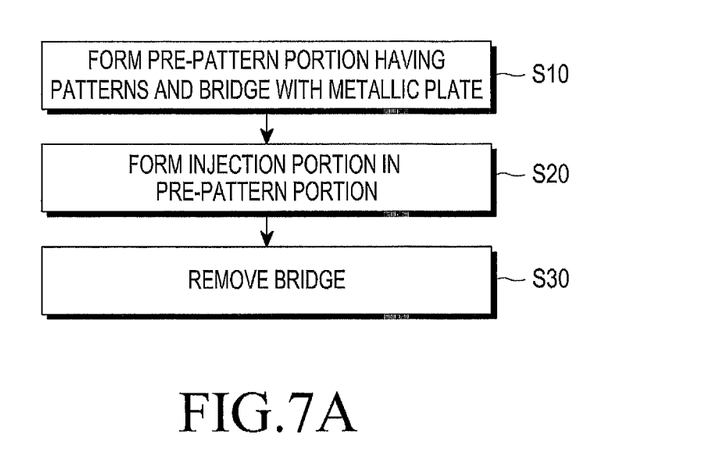
Figure 7B:
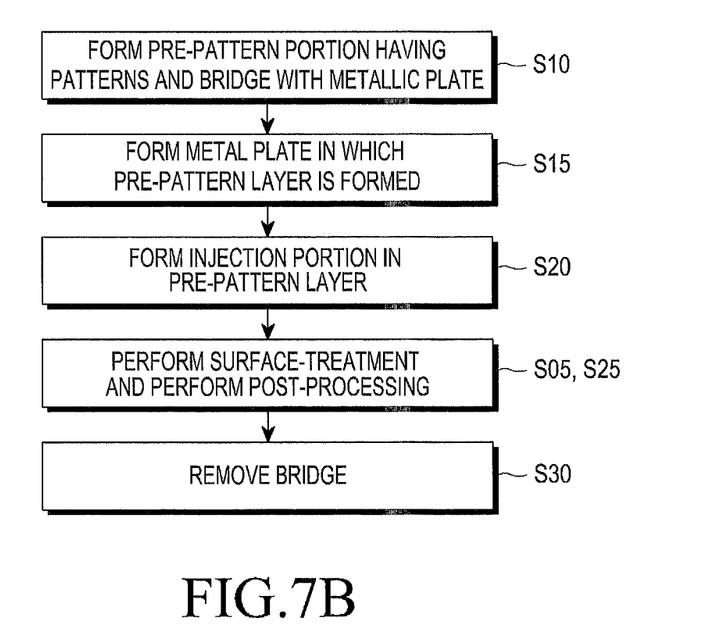
Figure 7C:
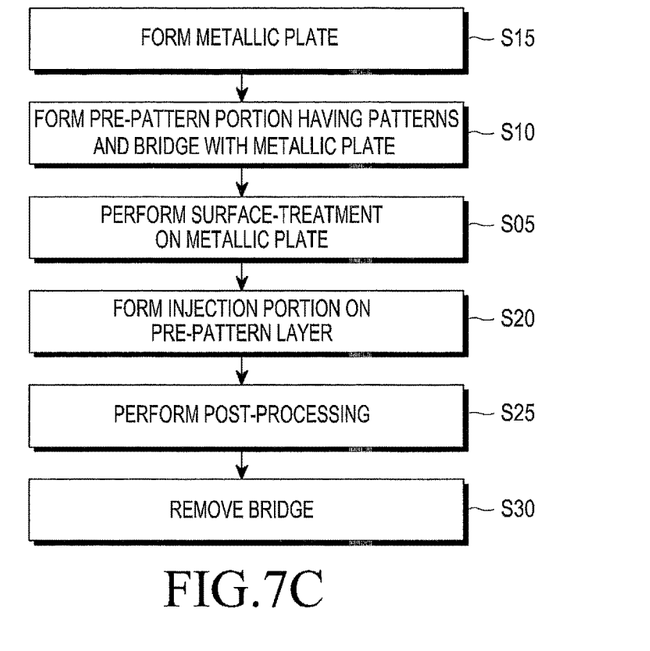
Figure 7D:
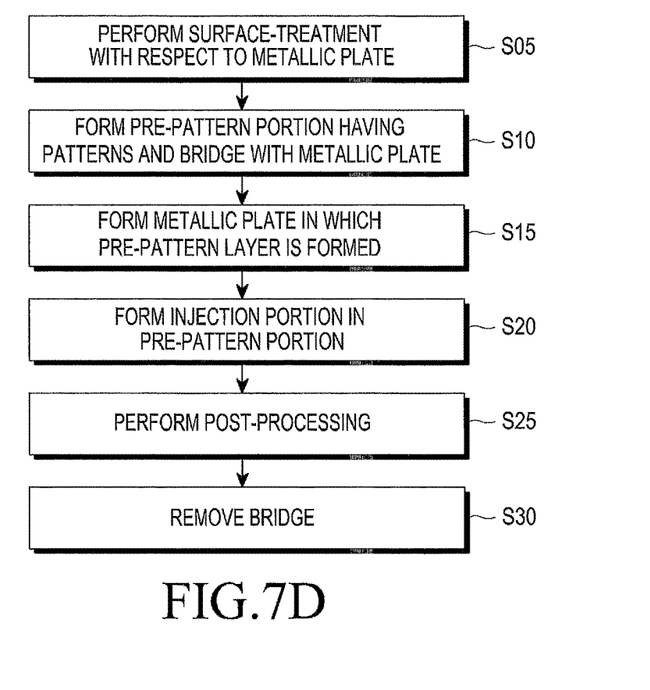

FIGS. 7A through 7D are flowcharts showing a method for manufacturing a cover having a metallic grid structure shown in FIGS. 3A through 6E. In particular, FIG. 7A shows only common steps of the method for manufacturing a cover having a metallic grid structure, and FIGS. 7B through 7D show the method for manufacturing a cover in which surface-treatment, foaming, and post-processing steps are modified based on FIG. 7A. With reference to FIG. 7A, to manufacture the cover having the metallic grid structure (hereinafter, the battery cover 100), the pre-pattern layer 105 is formed on the metallic plate 101 such as aluminum or STS at step S10. That is, on a surface of the metallic plate 101 are formed the patterns 111 which have regular or irregular form and are spaced apart from each other through etching, press, forging or CNC on the metallic plate 101, and on the other surface of the metallic plate 101 is formed the bridges 112 which connect the patterns 111 to fix the positions of the patterns 111 (see FIG. 5A and FIG. 6A).

Figure 5A:
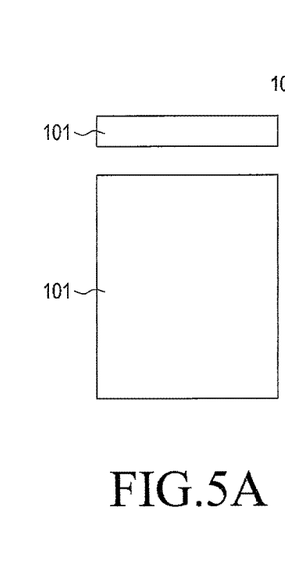
Figure 5B:
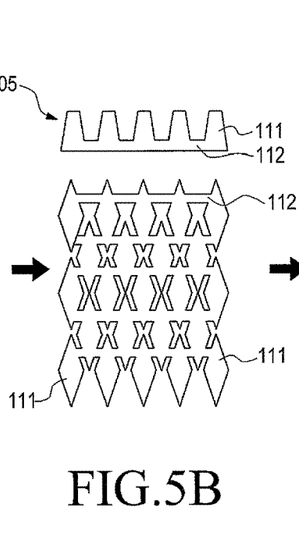
Figure 5C:
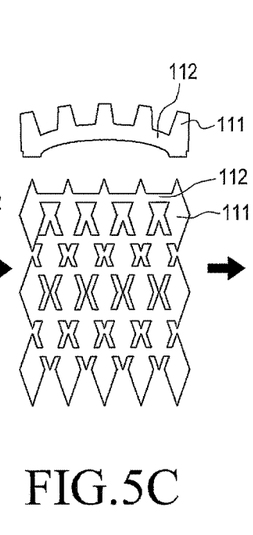
Figure 5D:
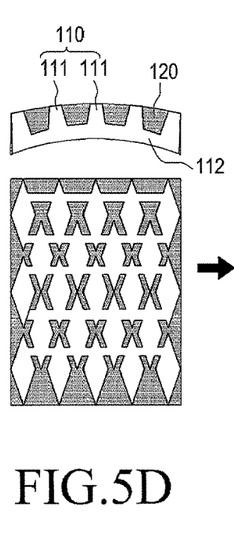
Figure 6A:
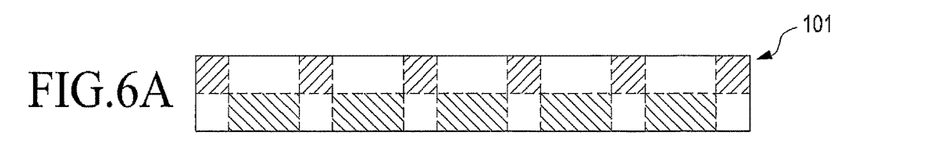
Figure 6B:
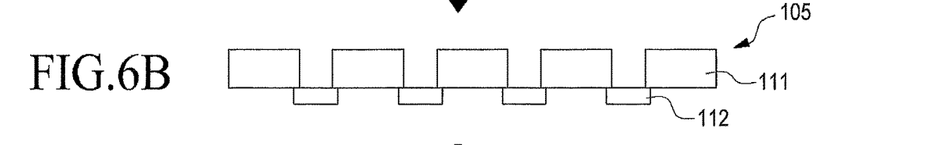
Figure 6C:
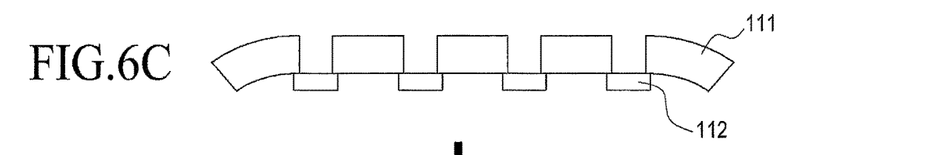
Figure 6D:
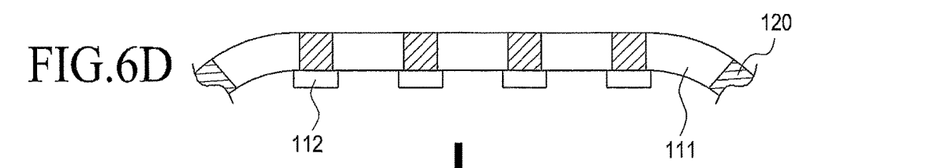

After the pre-pattern layer 105 having the patterns 111 and the bridges 112 are formed, a high-temperature and high-pressure injection material is provided between the patterns 111 through insert-injection or thermo-compression press on the pre-pattern layer 105, thereby forming the injection portion 120 at step S20 (see FIG. 5D and FIG. 6D). In this stage, when the high-temperature and high-pressure injection material is provided between the patterns 111 by means of the bridges 112, deformation such as dislocation or position change of the patterns 111 can be prevented.

Figure 5E:
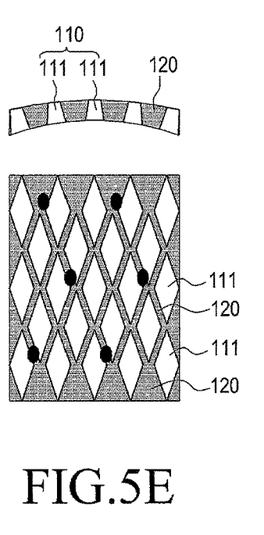
Figure 6E:
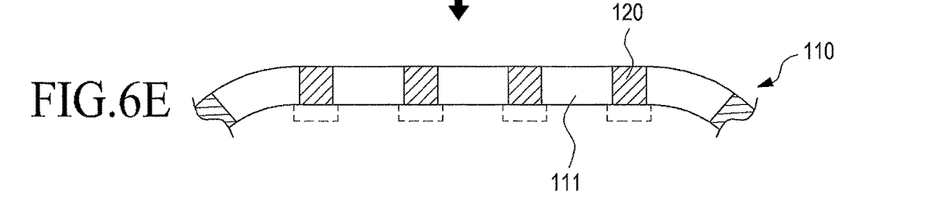

After the injection portion 120 is formed on the pre-pattern layer 105, the bridges 112 formed on a bottom or rear surface of the pre-pattern layer 105 is removed to secure antenna radiation performance through the entire surface of the battery cover 100 at step S30 (see FIG. 5E and FIG. 6E). Removal of the bridge 112 can be performed using various methods such as CNC, forging, etching, etc.

With reference to FIG. 7B, the battery cover manufacturing process further includes a forming step S15 for forming an exterior shape of the battery cover 100, and a surface-treatment step S05 and a post-processing step S25 for improving design and aesthetic sensibility. The forming step S15 involves bending both ends of the pre-pattern portion 105 to provide curves therein to fit for the shape of the battery cover 100, such that the circumference of the battery cover 100 has a curved shape engaged with a side of the portable terminal. The patterns 111 protrude from the front surface of the battery cover 100 to form the surface of the portable terminal, such that the user can visually check the patterns 111. Therefore, by applying various surface-treatment and post-processing to the patterns 111, various color impressions or tactile sensation can be provided.

As shown in FIG. 7B, the forming step S15 is further provided between the steps S10 and S20 of FIG. 7A. That is, the horizontal pre-pattern layer 105 is formed to have a curved shape along the shape of the portable terminal or the shape of the battery cover 100 at step S15. The forming step S15 of FIG. 7B can precede the step S10 of forming the pre-pattern layer 105, that is, the metallic plate 101 in which the pre-pattern layer 105 is not yet formed can be first formed and then the pre-pattern layer 105 can be formed.

Between step S20 and step S30 or after step S30, step S25 of performing surface-treatment and post-processing on the pre-pattern layer 105 in which the patterns 111 are formed or the surface of the pattern portion 110 can be further provided. If surface-treatment and post-processing are performed between step S20 and step S30, the surface of the patterns 111 formed on the pre-pattern layer 105 can be sanded, for example, through sandblasting, processed, for example, through hairline processing, buffing, or painting, and surface-treated, for example, through anodizing, thereby implementing various colors and surface shapes. If surface-treatment and post-processing are performed after step S30, post-processing and surface-treatment are performed on the surface of the patterns 111 from which the bridge 112 is removed, thereby implementing various colors or surface shapes.

Therefore, the pattern portion 110 made of a metallic material can be formed over the entire battery cover 100, and antenna radiation capability can be implemented in any position of the battery cover 100. In addition, various shapes of designs can be implemented and sophistication can also be achieved using a metallic material.

In the manufacturing method of FIG. 7B, the manufacturing can be performed in an order of forming the pre-pattern layer 105 with the metallic plate 101 (S10)→foaming (S15)→forming the injection portion 120 (S20)→surface-treatment and post-processing (S05, S25)→removing the bridge 112 (S30). Although not shown, the manufacturing can also be performed in an order of foaming the metallic plate 101 (S15)→forming the pre-pattern layer 105 with the foamed metallic plate 101 (S10)→forming the injection portion 120 (S20)→surface-treatment and post-processing (S05, S25)→removing the bridge 112 (S30). Also, as shown in FIGS. 7C and 7D, before the injection portion 120 is formed in the pre-pattern layer 105, the foaming step (S15) and the surface-treatment step (S05) can also be performed.

As shown in FIG. 7C, the metallic plate 101 is first foamed to fit for the shape of the battery cover 100 at step S15 before the pre-pattern layer 105 is formed at step S10. After the pre-pattern portion 105 is formed with the metallic plate 101 at step S10, surface-treatment is first performed at step S05 before the injection portion 120 is formed at step S20. After the injection portion 120 is formed in the surface-treated pre-pattern layer 105, post-processing is performed at step S25 and then the bridge 112 is removed at step S30.

As shown in FIG. 7D, after surface-treatment is performed on the metallic plate 101 in advance at step S05, the pre-pattern layer 105 is formed with the surface-treated metallic plate 101 at step S10. The surface-treated pre-pattern layer 105 is formed to fit for the shape of the battery cover 100 at step S15. The injection portion 120 is formed in the surface-treated and foamed pre-pattern portion 105 at step S20. The pre-pattern portion 105 in which the injection portion 120 is formed is post-processed at step S25, and then the bridges 112 are removed at step S30, such that the battery cover 100 is manufactured.

FIGS. 8A through 10 are views showing a cover having a metallic grid structure and a method for manufacturing the cover according to a second embodiment of the present disclosure. With reference to FIGS. 8A through 10, the second embodiment of the present disclosure will be described. In the description of the second embodiment with reference to FIGS. 8A through 10, the battery cover 100 will be taken as an example of the cover 100 in the first embodiment. However, the cover 100 is not limited to the structure of the battery cover 100, and as mentioned also in the first embodiment, various modifications such as a front cover or a rear cover provided in an electronic device can also be possible.

FIGS. 8A through 8E are views showing a cover having a metallic grid structure according to the second embodiment of the present disclosure. With reference to FIGS. 8A through 8E, a battery cover 200 includes a pattern portion 210, an injection portion 230, and a connection film layer 220. The pattern portion 210 includes a plurality of patterns 211 which are formed of a metallic material such as aluminum or STS and are spaced from each other to be disposed independently of each other. The injection portion 230 is formed of a material of a different kind from the pattern portion 210, and is filled between the patterns 211 and connects the patterns 211. The connection film layer 220 connects the pattern portion 210 and the injection portion 230, and has the patterns 211 disposed thereon and is surface-treated. In the structure of the battery cover 200, in a stacked and coupled state of the pattern portion 210, the connection film layer 220, and the injection portion 230, a position in which the pattern portion 210 is formed has a structure in which the pattern portion 210, the connection film layer 220, and the injection portion 230 are sequentially stacked, and the injection portion 230 is stacked under the connection film layer 220 in the state where the connection film layer 220 is positioned on the same line as the patterns 211 between one of patterns and its adjacent pattern.

Figure 8A:
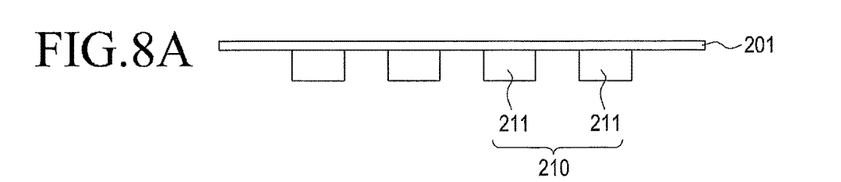

The pattern portion 210 and the connection film layer 220 are manufactured separated from each other (see FIG. 8A). That is, the pattern portion 210 is formed such that the patterns 211 formed of a metallic material are spaced from each other to be formed independently of each other, and the connection film layer 220 is formed as a medium connecting the pattern portion 210 and the injection portion 230. The pattern portion 210 includes the plurality of metallic patterns 211 which are spaced from each other independently of each other on a master 201. The plurality of patterns 211 can be individually formed on the master 201 in several ways.

Figure 9A:
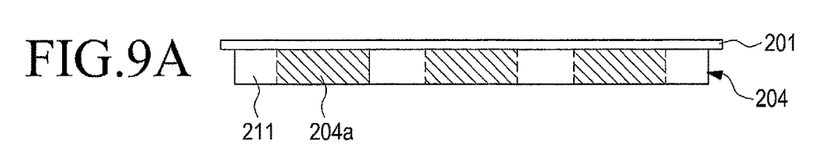
FIGS. 9A and 9B schematically show a state where a pattern portion having independently spaced patterns is formed on a master according to the second embodiment of the present disclosure by using etching and electroforming, respectively.
Figure 9B:
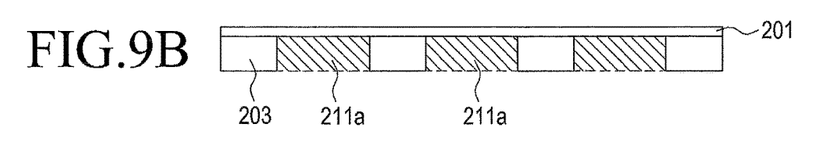

FIGS. 9A and 9B schematically show a state where a pattern portion having independently spaced patterns is formed on a master according to the second embodiment of the present disclosure by using etching and electroforming, respectively. With reference to FIGS. 9A and 9B, as shown in FIG. 9A, in this embodiment, the plurality of patterns 211 are independently formed spaced from each other by etching in the state where a metallic plate 204 is attached onto a master 201 such as a base film, or as shown in FIG. 9B, and the plurality of patterns 211 are formed on the master 201 which is conductive such as stainless steel. As shown in FIG. 9B, if the patterns 211 are formed on the conductive master 201 through forging, protrusions 203 having pattern forming grooves 211a are formed in the shape of the pattern portion 210 on the master 201 such as stainless steel. In this stage, if electricity flows on the master 201, a metallic material is stacked between the patterns forming grooves 211a. Upon removal of the protrusions 203 in this state, the independently spaced regular or irregular patterns 211 are formed on the master 201.

The connection film layer 220 secures an adhesive force between the pattern portion 210 and the injection portion 230, and through layer stacking such as printing or deposition, the connection film layer 220 expresses the surface of the battery cover 200. As mentioned above, the connection film layer 220 is manufactured separately from the pattern portion 210. For example, the connection film layer 220 is structured such that on a surface of a sheet 231 formed of a material including polyethylene terephthalate (PET), polycarbonate (PC), urethane or silicon is formed a surface-treatment layer 232 based on printing, deposition, UV molding or hairline processing or an adhesive layer 233 for securing an adhesive force with the injection portion 230 in formation of the injection portion 230.

Figure 8B:
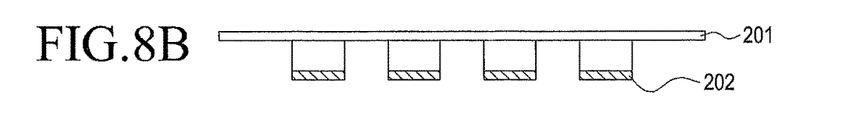
Figure 8C:
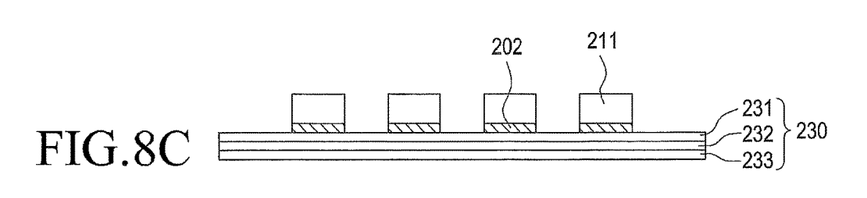
Figure 8D:
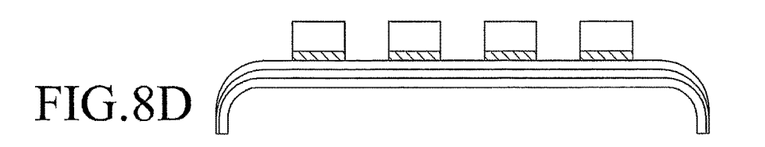
Figure 8E:
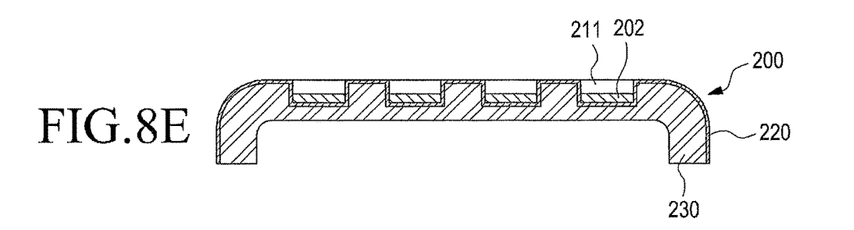

Therefore, the separately provided master 201 and pattern portion 210 are coupled (see FIGS. 8B and 8C). More specifically, after an adhesive 202 for adherence with the connection film layer 220 is applied onto a surface of the patterns 211 formed on the master 201 (see FIG. 8B), the patterns 211 are adhered to the connection film layer 220 (see FIG. 8C). Upon removal of the master 201 after the patterns 211 are provided between the master 201 and the connection film layer 220, the independently spaced patterns 211 are disposed on the connection film layer 220. The circumference of the connection film layer 220 from which the patterns 211 protrude is foamed to fit for the shape of the battery cover 200 (see FIG. 8D). Once a high-temperature and high-pressure injection product is insert-injected or formed by thermo-compression pressing on the other surface of the connection film layer 220 from a surface of which the patterns 211 protrude, then the connection film layer 220 is dislocated upwardly between the pattern 211 and the pattern 211, such that the injection portion 230 is formed between the pattern 211 and the pattern 211 and in a lower space of the patterns 211 (see FIG. 8E).

Thus, the metallic patterns 211 are independently disposed, such that a metallic material can be used for the entire battery cover 200 and antenna radiation capability can be implemented by the entire battery cover 200.

Figure 10:
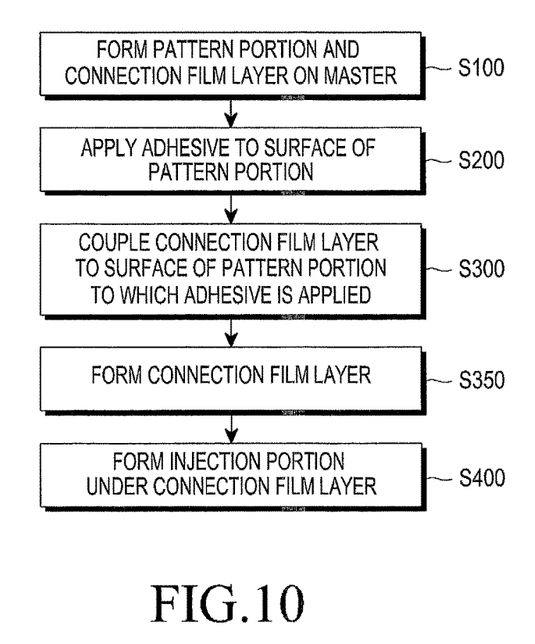
FIG. 10 is a flowchart showing a method for manufacturing a cover having a metallic grid structure according to the second embodiment of the present disclosure.

FIG. 10 is a flowchart showing a method for manufacturing the battery cover 200 having a metallic grid structure according to the second embodiment of the present disclosure. Referring to FIG. 10, in the method for manufacturing the battery cover 200 having the metallic grid structure according to the present disclosure, with a metallic plate adhered to the master 201 such as a base film, the pattern portion 210 having the plurality of metallic patterns 211 which are independently spaced apart from each other is formed by using etching or the like, or electricity flows on the conductive master 201 such as stainless steel, thereby forming the pattern portion 210 having the plurality of metallic patterns 211 which are independently spaced apart from each other. In addition, the connection film layer 220 which connects the pattern portion 210 and the injection portion 230 and whose surface is treated is formed at step S100.

That is, at step S100, the pattern portion 210 is formed, and separately from formation of the pattern portion 210, the connection film layer 220 is formed. A way to form the pattern portion 210, although already described above, will be described as follow. If etching is used, the metallic plate 204 adhered to the master 201 such as a base film is processed, for example through etching, to form the independently spaced patterns 211 having the regular or irregular form. In case of forging, electricity flows on the conductive master 201 such as stainless steel on which the protrusions 203 having the patterns forming grooves 211a formed therein are formed. Thus, in the pattern forming groove 211a are formed the patterns 211 which are spaced apart and thus separated from each other as the metallic material is continuously stacked. Upon removal of the protrusion 203 after the patterns 211 are formed on the master 201, only the independently separated patterns 211 remain on the master 201.

On the sheet 231 in the form of a film such as PET, PC, urethane, or silicon, is formed the connection film layer 220 which processes the surface-treatment surface 232 based on printing, deposition, or ultraviolet (UV) molding, or the adhesive layer 233 for securing an adhesive force with the injection portion 230.

As such, the pattern portion 210 formed on the master 201 such as the base film or conductive stainless steel and the connection film layer 220 are separately formed at step S100, after which the adhesive 202 is applied onto a surface of the pattern portion 210 to couple the pattern portion 210 with the connection film layer 220 at step S200.

After the connection film layer 220 separately formed from the pattern portion 210 is adhered to the surface of the pattern portion 210 onto which the adhesive 202 is applied, the master 201 is removed at step S300. In particular, when the injection portion 230 is formed later, the connection film layer 220 prevents the pattern portion 210 from being dislocated or moved by formation of the injection portion 230 and also allows the pattern portion 210 to be fixed in the injection portion 230. When the high-temperature and high-pressure injection product is filled between the patterns 211, the connection film layer 220 is dislocated upwardly to the same position as the surface of the patterns 211, such that the surface of the battery cover 200 is formed between the patterns 211.

After the master 210 is removed, the pattern portion 210 is arranged in a state of being adhered to the connection film layer 220. After the pattern portion 210 is formed on the connection film layer 220 in this way, the connection film layer 220 coupled with the pattern portion 210 is formed in correspondence to the shape of the battery cover 200 at step S350. For example, if the battery cover 200 has such a shape that its peripheral circumference is bent, the peripheral end portion of the connection film layer 220 is bent. The injection portion 230 is formed on the foamed connection film layer 220 having such a shape at step S400. The injection product formed of a material including high-temperature and high-pressure PC, acrylonitrile-butadien styrene (ABS), polyamide (PA), polyphthalamide (PPA), or polyphenylene sulfide (PPS) is insert-injected or thermo-compression pressed under the connection film layer 220. Thus, the connection film layer 220 provided between the pattern 211 and the adjacent pattern 211 is deformed and thus is dislocated upwardly between the pattern 211 and the adjacent pattern 211 in such a way to be inserted in an engaged manner therebetween, in which the injection product is pushed and filled in the space between the patterns 211.

Therefore, the patterns 211 are coupled in an independently separated state by the injection portion 230. Thus, the pattern portion 210 formed of a metallic material is formed across the battery cover 200 and antenna radiation capability can be implemented over the entire battery cover 200.

As is apparent from the foregoing description, according to the present disclosure, a metallic pattern can be formed over a cover provided in an electronic device, especially over the entire battery cover, without affecting antenna radiation capability regardless of a position of an antenna installed in a portable terminal.

Moreover, since the metallic pattern can be formed across the cover, sophistication of the portable terminal can be implemented and aesthetic sensibility and quality of the portable terminal can be improved.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A battery cover having a metallic grid structure, the battery cover comprising:
    a pattern portion formed of a metallic material, in which a plurality of metallic patterns is independently disposed spaced apart from each other, at least a portion of the plurality of metallic patterns forming a first portion of an exterior surface of the battery cover;
    a plurality of injection portions disposed between the plurality of metallic patterns to fix the plurality of metallic patterns, wherein the plurality of injection portions and the plurality of metallic patterns form a flat layer, wherein the plurality of injection portions is formed of a non-metallic material such that the plurality of metallic patterns only partially cover the battery cover; and
    a connection film layer for applying adhesive force between the pattern portion and the plurality of injection portions, the connection film layer disposed between the pattern portion and the injection portion,
    at least one portion of the connection film layer forming a second portion of the exterior surface of the battery cover, the second portion disposed between adjacent patterns in the plurality of metallic patterns, wherein the first portion and the second portion evenly form the exterior surface of the battery cover, and
    wherein the plurality of injection portions is disposed between the plurality of metallic patterns and under the plurality of metallic patterns.

2. The battery cover of claim 1, wherein:
    for the pattern portion, a pre-pattern portion is formed by press, forging, etching, or CNC on a metallic plate prior to coupling of the plurality of injection portions, and
    wherein the plurality of metallic patterns are formed on one portion of surface of the pre-pattern portion and the plurality of injection portions is formed between the plurality of metallic patterns on another surface of the pre-pattern portion, at least one bridge connecting the plurality of metallic patterns is formed to fix positions of the plurality of metallic patterns.

3. The battery cover of claim 2, wherein the at least one bridge is removed after formation of the plurality of injection portions, such that antenna radiation is able to pass through an entirety of the battery cover.

4. The battery cover of claim 3, wherein the at least one bridge is provided to protrude laterally downwardly from the plurality of metallic patterns to connect lower portions of the plurality of metallic patterns with lower portions of adjacent patterns.

5. The battery cover of claim 4, wherein the plurality of injection portions are formed of a material including polycarbonate (PC), acrylonitrile-butadien styrene (ABS), polyamide (PA), polyphthalamide (PPA), or polyphenylene sulfide (PPS).

6. The battery cover of claim 5, wherein the plurality of injection portions are is provided between the plurality of metallic patterns on the pre-pattern portion by insert-injection or thermo-compression press.

7. The battery cover of claim 3, wherein the pattern portion is processed to have a color or a surface shape on its front surface through hairline processing, sandblasting, anodizing, deposition or painting.

8. The battery cover of claim 1, further comprising at least one bridge connecting the plurality of metallic patterns, the at least one bridge configured to fix positions of the plurality of metallic patterns.

9. The battery cover of claim 8, wherein the at least one bridge is removable after formation of the plurality of injection portions, such that antenna radiation is able to pass through the battery cover.

10. The battery cover of claim 1, wherein the pattern portion is surface-treated by one of: hairline processing, sandblasting, anodizing, deposition or painting.

11. A battery cover having a metallic grid structure, the battery cover comprising:
    a pattern portion formed of a metallic material, in which a plurality of metallic patterns are independently disposed spaced apart from each other, at least a portion of the plurality of metallic patterns forming a first portion of an exterior surface of the battery cover;
    a connection film layer for applying an adhesive force between the pattern portion and an injection portion, a portion of the connection film layer disposed on a side surface of which the metallic patterns are disposed, the connection film layer disposed between the pattern portion and the injection portion, and at least a portion of the connection film layer comprising a second portion of the exterior surface of the battery cover, wherein the first portion and the second portion evenly form the exterior surface of the battery cover; and
    a plurality of injection portions formed of a non-metallic material, the plurality of injection portions being filled between the plurality of metallic patterns, wherein the plurality of injection portions and the plurality of metallic patterns form a flat layer such that the plurality of metallic patterns only partially cover the battery cover, at least another portion of the connection film layer disposed on the exterior surface of the battery cover and between adjacent patterns in the plurality of metallic patterns, and
    wherein the plurality of injection portions are disposed between the plurality of metallic patterns.

12. The battery cover of claim 11, wherein the connection film layer is surface-treated, and the pattern portion and the connection film layer are separately manufactured, and the adhesive force is applied to a surface of the pattern portion to couple the pattern portion to the connection film layer.

13. The battery cover of claim 12, wherein the pattern portion is formed on a master by etching or is manufactured on a conductive master by electroforming.

14. The battery cover of claim 13, wherein:
    the pattern portion is formed by electroforming and protrusions in which pattern forming grooves for forming the plurality of metallic patterns is provided on the conductive master, and
    after metallic patterns are formed between patterns forming grooves by conducting the master, the protrusions are removed from the master, and
    after the adhesive force is applied onto top ends of the patterns, the connection film layer is adhered to the pattern portion and the master is removed, thereby disposing the pattern portion on the connection film layer.

15. The battery cover of claim 14, wherein the connection film layer comprises one of polyethylene terephthalate (PET), polycarbonate (PC), urethane, or silicon.

16. The battery cover of claim 15, wherein surface-treatment comprising one of deposition, printing, or ultraviolet (UV) molding is performed on the connection film layer.

17. The battery cover of claim 16, wherein the adhesive force is applied onto a surface of the plurality of metallic patterns and the plurality of metallic patterns are coupled to a surface of the connection film layer after the master is removed.

18. The battery cover of claim 17, wherein after the plurality of metallic patterns are coupled to the connection film layer, the connection film layer is formed.

19. The battery cover of claim 18, wherein the plurality of injection portions are formed on a bottom surface of the connection film layer toward the plurality of metallic patterns at a high temperature and a high pressure in such a way to dislocate the connection film layer upwardly between the plurality of metallic patterns, such that the plurality of injection portions are filled between the plurality of metallic patterns and under the connection film layer.

20. The battery cover of claim 11, wherein the pattern portion is surface-treated by one of: hairline processing, sandblasting, anodizing, deposition or painting.

21. The battery cover of claim 11, wherein the battery cover comprises a battery housing of a portable electronic device.

* * * * *